Patented Oct. 12, 1954

2,691,593

UNITED STATES PATENT OFFICE 2,691,593

SILVER CLEANING AND POLISHING COMPOSITION

Souren Z. Avedikian, Larchmont, N. Y.

No Drawing. Application June 18, 1949,
Serial No. 100,079

2 Claims. (Cl. 106—5)

This invention relates to a composition of matter, in paste or liquid form, for the cleaning, polishing and protection of metals, especially silver, glass, plastic surfaces, rubber surfaces, painted surfaces, and a method of preparing same.

There has long existed a need for a material which after cleaning a surface also afforded such surface protection against rapid soiling. My invention covers such a product. My composition consists of a suspension in water of the following: an abrasive—or a mixture of abrasives—a protective agent, and solvents said suspension being obtained by the admixture of suitable emulsifying and suspending agents and an alkaline agent and the method of accomplishing said admixture described more fully below. The suspension can oe varied in consistency from a creamy lotion to a creamy paste at will. The desired ultimate method of packaging and dispensing will determine whether a paste or a lotion is to be prepared.

In preparing this cleaning and polishing composition in creamy paste form, I prefer to use the ingredients in about the following proportions—namely, 50 pounds of emulsifying agent, 258 pounds of solvents, 100 pounds of abrasives, 6 pounds of a protective agent, 14 pounds of suspending agents, 16 pounds of ammonium hydroxide (26° Bé., approximately 29% NH3 content) and 311 pounds of water. A minute quantity of a dye and a small amount of a white pigment to serve as a brightening agent are used jointly to impart a bright coloration to the finished product. Good results may also be obtained, however, when the ingredients are varied within the following limits: emulsifying agent, 10 to 75 pounds; solvents, 100 to 350 pounds; abrasives, 50 to 150 pounds; protective agents, 4 to 40 pounds; suspending agents, 6 to 22 pounds; ammonium hydroxide, 4 to 20 pounds; and water in correct relationship to the solvents, abrasives and suspending agents to secure a paste having the desirable characteristics of viscisity and density.

By increasing the quantity of water from the 311 pounds mentioned above to approximately 850 pounds, the product which can be characterized as a creamy lotion is obtained. This lotion is the liquid form of my cleaning, polishing and protecting composition.

In the preferred embodiment of my invention, the creamy paste is prepared from the following specific ingredients in the manner described below.

Emulsifying agents used in the amount of 50 pounds (6.60%) comprise sulfated, ammonia neutralized, castor oil fatty acids having a composition approximately as follows: ricinoleic acid, 87%; oleic acid, 8%; linoleic acid, 3%; stearic acid, 2%.

Solvents used in the amount of 257½ pounds (34.02%) comprise 248 pounds of a 50/50 mixture of 2 highly refined, straight run, petroleum naphthas, one having a flash point (Tag closed cup) of 100° F. (min.), with initial and final boiling points of 310° F. and 385-395° F.; the other a flash point of 140° F. (min.), with initial and final boiling points of 356° F. and 493° F.; 3¼ pounds of amyl acetate; 6¼ pounds of pine oil.

Abrasive used in the amount of 100 pounds (13.20%) comprises a 50/50 mixture of two grades of diatomaceous earth which have a fineness designation of 99% or more through 325 mesh, with average particle size distribution of 1–2 microns for the first and 2–4 microns for the second grade.

Protective agents used in the amount of 6 pounds (0.79%) comprise a paraffin wax, refined, white.

Suspending agents used in the amount of 14 pounds comprise 2 pounds of sodium carboxymethylcellulose (high viscosity), known also as cellulose gum; and 12 pounds of bentonite, grit-free; a total of 1.81%.

Ammonium hydroxide used in the amount of 16 pounds (2.11%) is a technical grade aqua ammonia having a content of approximately 29% NH3.

Water is used in the amount of 311 pounds (41.03%) from ordinary city water supply system.

Coloring agents used in the amount of 3 pounds (0.40%) comprise 3 pounds of titanium dioxide white pigment; 6.2 grains (0.4 gram) of Brilliant Blue FCF; and 62 grains (4.0 grams) of Rhodamine B hydrochloride.

The cellulose gum and dyes are dissolved with agitation in approximately 66 pounds of water. The white pigment, the abrasives and the bentonite are dispersed with agitation in approximately 226 pounds of water to form a slurry. This is termed "thick slurry." At this stage, this makes a consumption of 292 pounds of water. The balance of 19 pounds of water is used as described below. The wax is dissolved in the solvents and the emulsifying agent is dispersed therein. To this mixture, a "thinned slurry" (prepared by adding 12 pounds of water to 81.5 pounds of the "thick slurry" prepared above) is added slowly with vigorous agitation over a period of about 5 minutes. At the end of this period of time, the mixture assumes the appearance of a stiff paste. Agitation is continued at this stage for 15–16 minutes longer. Then the balance of the "thick slurry" is added, slowly or rapidly, with agitation, followed by the solution of cellulose gum and dyes. The remaining 7 pounds of water can be used to rinse containers into the mixture. When a uniform paste results, the ammonium hydroxide is added. Agitation is continued for a period of 5–10 minutes until a smooth paste is obtained. The cleaning, polishing and protecting composition in creamy paste form is now ready to pack.

In preparing the creamy lotion type of composition, the additional quantity of water can be added either before or after the ammonium hydroxide.

The preferred embodiment cites a specific ingredient or a combination of ingredients for each class of materials used in the preparation of my product. It is not intended to limit the scope of this invention to the use of the items listed, but it is desired to include equivalents which would function in a manner consistent with securing the desired results of cleaning and polishing surfaces and protecting or preserving such surfaces, once they have been cleaned and polished, against easy soiling. For example, instead of the emulsifying agent mentioned above, I may use one known as diglycol stearate, or one recognized as polyoxyethylene sorbitan monooleate, or equivalents thereof; fatty acid emulsifiers; petroleum derivative emulsifiers; etc. The procedure followed in preparing the composition is then modified slightly to secure best results. In like manner, the solvents mentioned in the preferred embodiment are by way of illustration and preference only, but many other solvents and all solvents capable of dissolving various kinds of dirt can be employed. For examples, the following will be cited: lower boiling petroleum naphthas, kerosene, deodorized solvents, ethers, esters, alcohols, glycols, aromatic solvents, etc. The abrasives mentioned have been found to give excellent results, hence the preference expressed hereinabove. However, either can be used singly, or a milder abrasive such as talc or calcium carbonate can be used for extremely soft and fine surfaces. A coarser or harsher abrasive can also be used such as feldspar or pumice on such surfaces as rubber, and wood especially when a highly polished surface is desired as for example in the preparation of a glass-like surface, such as is commonly referred to as a "piano finish."

In the case of protective agents, paraffin wax has been mentioned. It has been found that this wax over a range of melting points, 125° to 140° F., functions satisfactorily. After cleaning and polishing with the composition of this invention, a sufficiency of film is left behind on the article or surface polished to afford it protection. Articles treated with this composition retain their clean appearance, luster and gloss longer than when treated by other polishes. Silver when polished by this composition attains a deep luster faster with less rubbing and expenditure of effort than ordinarily, and furthermore it retains its luster longer. However, in place of the paraffin wax, any of the waxes of commerce may be used, e. g., carnauba wax, beeswax, etc. An unexpected result has been found. If a sulfur compound, for example, the mercaptan-type compounds ordinarily employed as rubber accelerators, is added to my composition, the silver polished with it remains lustrous, untarnished and retains its luster 2 to 10 times longer than when polished even with the composition described in the preferred embodiment above. The compound I prefer to use is mercaptobenzothiazole in a concentration of about 3% although as low as 0.5% is effective. The upper limit is controlled by economic considerations. The following compounds normally used as rubber accelerators or the like have been found effective: dibenzothiazyldimethylolurea; benzothiazylthiobenzoate; tetramethylthiuramdisulfide; zinc salt of diethyldithiocarbamic acid; sodium mercaptobenzothiazole; thiourea; etc. In lieu of the rubber accelerators mentioned, it has also been found that the incorporation of compounds normally used as anti-oxidants, for example in soaps, oils, etc., produces a composition effective in protecting luster of polished silver longer than by ordinary means. In this category are the various guanidine derivatives, hydroquinone derivatives, gallates, etc. Either type of protective agent, other than the waxes, can be added to the product after it has been completely prepared, or it can be incorporated in the slurry, or mixed with the solvents so long as an intimate mixture results ultimately. Protection is afforded other metals as well, e. g., copper, brass, etc.

In the case of suspending agents, sodium carboxymethylcellulose (high viscosity) has been mentioned as one of the preferred agents. Gums of lower viscosity can be used as well. Also, natural gums such as tragacanth, acacia (arabic), agar, etc., can be used to replace cellulose gum though the latter is preferred due to uniformity and greater stability. Bentonite clay is mentioned as the second and mineral-type suspending agent. Any highly colloidal clay will function in a similar manner.

The creamy paste form of my invention is extremely unctuous, surprisingly free flowing and soft. It lends itself exceptionally well to packaging in collapsible tubes of either lead or tin construction. Because of its outstanding qualities, it can be used in much smaller amounts than would be required of ordinary polishes and accomplishes a higher degree of cleaning and polishing action than ordinary, furthermore it imparts protection qualities to the treated surfaces not elsewhere found. The finished product either in paste form or in liquid form is stable, virtually permanently stable, material prepared and left standing more than 10 months showing no separation of ingredients. The alkalinity of my composition is controlled between a pH of 8.50 and a pH of 10.00. It has no harmful effects on the user's hands; on the contrary, it exerts a mild cleaning action and its unctuous character tends to protect the skin.

I am aware that prior to my invention cleaning and polishing compositions have been made and used utilizing jointly and/or severally abrasives, solvents, emulsifying agents, etc. I therefore do not claim such combinations only; but I claim:

1. A silver cleaning and polishing composition comprising a creamy paste of the following approximate proportions by weight; 50 parts of emulsifying agent comprising sulfated, ammonia-neutralized castor oil fatty acids; 248 parts of a 50–50 mixture of two highly refined, straight run, petroleum naphthas, one having a flash point of 100° F. (minimum), with initial and final boiling points of 310° F. and 385–395° F.; the other a flash point of 140° F. (minimum), with initial and final boiling points of 356° F. and 493° F.; 100 parts of abrasive comprising an approximately 50-50 mixture of two grades of diatomaceous earth which have a fineness of at least 99% through a 325 mesh, with average particle size of 1 to 2 microns for the first, and 2 to 4 microns for the second grade; 6 parts of paraffin wax; suspending agents comprising 2 parts of sodium carboxymethylcellulose and 12 parts of bentonite; 311 parts of water, and 16 parts of ammonium hydroxide to alkalize and stabilize the composition.

2. The silver cleaning and polishing composition of claim 1 including also approximately 0.5 to 3% of an ingredient from the group consisting of dibenzothiazyldimethylolurea, benzothiazylthiobenzoate, tetramethylthiuraindisulfide, zinc salt of diethyldithiocarbamic acid, sodium mercaptobenzothiazole, and thiourea.

References Cited in the file of this patent

UNITED STATES PATENTS

| Number | Name | Date |
|---|---|---|
| 2,141,729 | Thompson | Dec. 27, 1938 |
| 2,154,721 | Blount et al. | Apr. 18, 1939 |
| 2,169,717 | Young | Aug. 15, 1939 |
| 2,209,463 | Lieber et al. | July 30, 1940 |
| 2,214,263 | Weihe | Sept. 10, 1940 |
| 2,250,667 | Hall | July 29, 1941 |
| 2,356,792 | Oakes et al. | Aug. 29, 1944 |

OTHER REFERENCES

Washing, Cleaning and Polishing Materials, Bureau of Standards Circular C424 (1939), pages 42–46.

Sodium Carboxymethylcellulose, Pamphlet of Hercules Powder Co., Wilmington, Delaware (1944), pages 2–4.